United States Patent Office 3,839,365
Patented Oct. 1, 1974

3,839,365
CYCLOOCTADIENE COMPOUNDS AND PROCESS OF PREPARING SAME
Gerhard Martin Julius Schmidt, Meir Lahav, and Gad Friedman, Rehovot, Israel, assignors to Yeda Research & Development Co., Ltd., Rehovot, Israel
No Drawing. Filed May 14, 1970, Ser. No. 37,335
Claims priority, application Israel, May 14, 1969, 32,224/69
Int. Cl. C07c 61/26, 69/74; C07d 5/32
U.S. Cl. 260—346.3  4 Claims

ABSTRACT OF THE DISCLOSURE

The present invention relates to the preparation of novel derivatives of cyclooctadiene tetracarboxylic acid. These are prepared by a photochemical dimerisation reaction of solid trans,trans-muconic acid, followed by a thermal treatment, to result in the formation of cyclooctadiene tetracarboxylic acid, which is converted into the desired products, such as acids, anhydrides, esters, lactones and the like.

SUMMARY OF THE INVENTION

The present invention relates to a novel process for the preparation of certain novel derivatives of cyclooctadiene tetracarboxylic acid.

The novel process according to the present invention comprises effecting a photochemical dimerisation reaction of solid, crystalline trans,trans-muconic acid, followed by a thermal treatment, to result in the formation of cyclooctadiene tetracarboxylic acid. This intermediate is not isolated, and it can be directly converted into certain desired products, which are novel compounds.

The photochemical dimerisation reaction is effected by irradiating solid, crystalline trans,trans-muconic acid. This may be irradiated either as the dry crystalline compound, advantageously spread out in a thin layer. It may also be irradiated while it is suspended in a suitable photochemically inert suspension medium, in which the trans,trans-muconic acid has a low solubility. The irradiated material is subjected to a thermal treatment, resulting in the formation of the desired cyclooctadiene tetracarboxylic acid. This may be done at the stage of evaporation of the solvent. The material must be heated to about 70° C. in order to obtain the desired result.

The thus obtained cyclooctadiene tetracarboxylic acid is not separated. As will be shown in the following reaction scheme, it can be converted directly into a number of desired products of reaction, which are novel compounds.

The novel products of the present invention are useful as intermediates in organic synthesis. They are useful as intermediates and as monomers for various polymerization reactions. They are of value in the production of polyimides, of pyrone type polymers, as curing agents for epoxides and for the production of alkyd resins.

The reaction scheme can be shown schematically as follows:

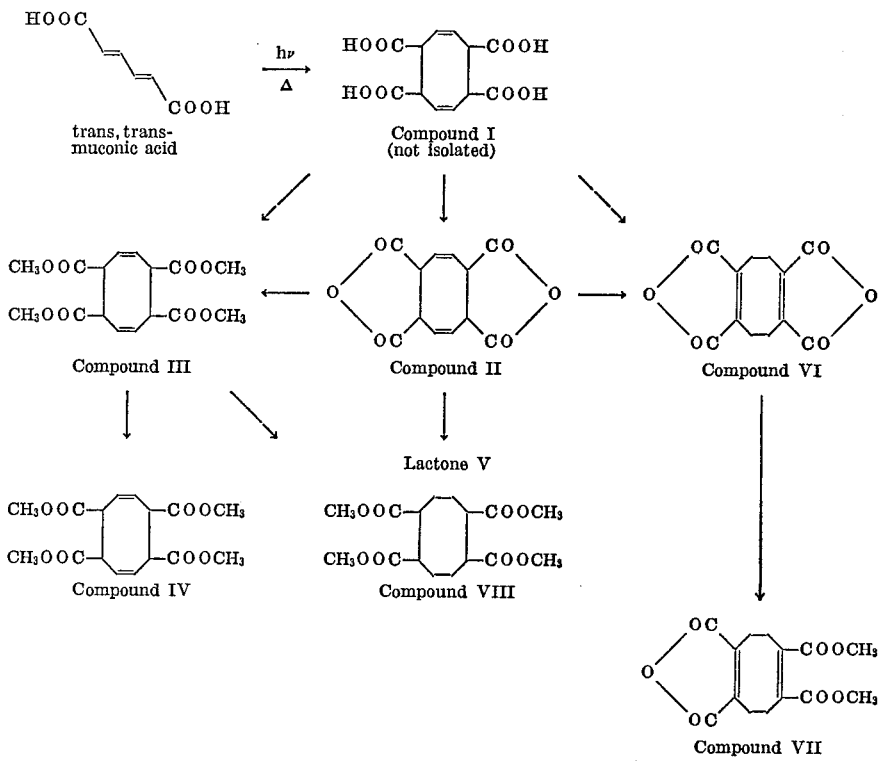

The invention is illustrated by the following examples, which are to be construed in a non-limitative sense:

Example 1

A quantity of 20 g. of crystalline trans,trans-muconic acid, spread out in a thin layer, was irradiated during 10 days with a Westinghouse sun lamp. After this period, there was added a quantity of 40 ml. methanol, stirred and filtered. The unreacted starting material (9.3 g.) did not dissolve, whereas the reacted material was obtained in the liquid phase. After evaporation till dry, during which the material was heated to 70° C., acetyl chloride was added. After reflux during 2 hours and subsequent cooling, 3,7 - cis,cis-cyclooctadiene-1,2,5,6-[a]-tetracarboxylic acid bisanhydride (6.3 g.), M.P. 155–160° C. (Compound II) precipitated. The analytical sample was

*Analysis.*—Calculated for $C_{15}H_{11}O_6$: C=62.72, highly dependent on the rate of heating. The compound crystallizes together with benzene in a ratio of 2 moles of the anhydride to 1 mole of benzene. $\nu_{max}$(KBr) 1870, 1790, 1640, 705$^{-1}$; N.M.R. $\tau$—2.63, 4.00 and 5.32 in the ratio 3:4:4.

*Analysis.* — Calculated for $C_{15}H_{11}O_6$: C=62.72, H=3.82. Found: C=62.74, H=3.84%.

Example 2

A quantity of 10 g. trans,trans-muconic acid was irradiated as in Example 1 and the reacted material was removed from unchanged starting material (4.65 g.) by solution in methanol. The methanolic solution was heated to above 70° C. and dry hydrogen chloride was introduced. After reflux for 4 hours, the reaction mixture was evaporated to dryness and the residue was taken up in ether. The resulting solution was dried over magnesium sulfate, filtered, evaporated and the residue was crystallized from ethyl acetate/light petroleum to yield 1,2,5,6-[a]-tetracarbomethoxy - 3,7 - cis,cis-cyclooctadiene (Compound III), 3.2 g. M.P. 85–88° C. The analytical sample had a M.P. of 88–90° C, $\nu_{max}$(KBr)–1730, 1640, 705; N.M.R. two signals centered at 4.1 and 5.9 and a singlet at 6.3 in the ratio 1:1:3.

*Analysis.*—Calculated for $C_{16}H_{20}O_8$: C=56.46, H=5.9. Found: C=56.43, H=5.7%.

From the mother liquor there separated an isomer of (III), probably 1,5/a/2,6/e/ - tetracarbomethoxy - 3,7-cis,cis-cyclooctadiene, 1.15 g., M.P. 144–145° C. (Compound IV). $\nu_{max}$(KBr)–1730, N.M.R.—multiplets centered at 4.32 and 5.98 and a singlet at 6.28 in the ratio 1:1:3.

*Analysis.*—Calculated for $C_{16}H_{20}O_8$: C=56.46, H=5.9. Found: C=56.51, H=6.01%.

Example 3

5 g. of the Compound II were boiled with 100 ml. of methanolic hydrogen chloride during 6 hours, yielding 4.5 g. of Compound III and 1.5 g. of Compound IV.

Example 4

Compound II was boiled with 60 percent sulfuric acid for 2 hours, the solution was poured on ice and extracted with ethyl acetate. The organic extract was dried, concentrated and chloroform was added. An acid lactone precipitated (Compound V). M.P. 290–292° C., $\nu_{max}$(KBr)

1750, 1730, 1690, 1640.

*Analysis.*—Calculated for $C_{12}H_{12}O_8$: C=50.71, H=4.26. Found: C=50.14, H=3.99%.

While the compound is an acid lactone, its structure could not be determined with certainty.

Example 5

Treatment of Compound III with methanolic ammonia at room temperature for 1 hour followed by evaporation till dry and crystallization from methanol yielded Compound IV, 3.0 g.

Example 6

Solid crystalline trans,trans-muconic acid (10 g.) was irradiated as in Example 1, after which 20 ml. of water were added so as to dissolve the reacted material. 4.0 g. of unreacted muconic acid were filtered off. The aqueous solution was evaporated to dryness and heated during the evaporation to about 75° C., after which the residue was refluxed for 3 hours with 40 ml. of acetyl chloride. After cooling, a solid precipitate was obtained (3.7 g.) which was filtered off and heated during 1 hour at 150° C. After cooling and washing with a small quantity of methanol, there was obtained 1,5-cis,cis-cyclooctadiene 1,2,5,6-tetracarboxylic acid bisanhydride (3.6 g.), M.P. 260–265° C., Compound VI. The analytical sample was recrystallized from acetone, M.P. 265–268° C. (dependent on rate of heating). $\nu_{max}$(KBr)–1860, 1790, 1660 cm.$^{-1}$, N.M.R. (deuterated DMSO) singlet at $\tau$ 7.27.

*Analysis.*—Calculated for $C_{12}H_8O_6$: C=58.07, H=3.25. Found: C=58.36, H=3.04%.

Alternately, the aqueous filtrate from unreacted muconic acid was concentrated, 50 ml. xylene were added, and the mixture was boiled until all the water had distilled off. The remainder was cooled, the solid filtered off and crystallized from dimethyl sulfoxide/methanol, yielding 3.4 g. of Compound VI.

Example 7

15 g. of trans,trans-muconic acid were suspended in 60 ml. water and irradiated for 5 hours with a Hanau Q 81 lamp (Vycor filter, internal cooling), with constant stirring. When the solid had completely dissolved, 30 ml. water were removed under reduced pressure and the remainder was treated with 75 ml. of xylene as in Example 6. All the water was distilled off azeotropically and excess xylene was removed under reduced pressure. The residue was washed with a little methanol and extracted with actone. The acetone extract deposited 6 g. of crystalline 1,5 - cis,cis - cyclooctadiene-1,2,5,6-tetracarboxylic acid bisanhydride. Addition of light petroleum precipitated a further 3.9 g. of this compound. Alternately Compound VI could be crystallized from dimethylsulfoxide/methanol as in Example 6.

Example 8

10 g. trans,trans-muconic acid were suspended in 500 ml. petroleum ether and irradiated during 5 hours as set out in Example 7. The petroleum ether was distilled off and the solid residue was taken up in 20 ml. water and filtered, leaving 2.0 g. of the unreacted starting material. Evaporation of the filtrate to dryness followed by xylene distillation as in Example 6 led to the formation of Compound VI, 4.15 g.

Example 9

Compound VI obtained in the preceding example, was boiled under reflux with methanolic hydrogen chloride for 16 hours. Excess of the reagent was removed under reduced pressure and the residue was purified by chromatography on kieselguhr. After elution with a mixture of benzene/chloroform there was obtained 1,2-dicarbomethoxy - 1,5-cis-cis-cyclooctadiene-5,6-dicarboxylic acid anhydride, M.P. 62–63° C. $\nu_{max}$(KBr)–1785, 1840, 1715, 1650 cm.$^{-1}$. N.M.R.–$\tau$ 6.21 and 7.80.

*Analysis.*—Calculated for $C_{14}H_{14}O_8$: C=57.14, H=4.80. Found: C=57.13, H=4.78%.

Example 10

Compound III was dissolved in ethyl acetate and hydrogenated at room temperature and atmospheric pressure with the aid of palladized charcoal, yielding 1,2,5,6-tetramethoxycarbonyl cyclooctane, Compound VIII. $\nu_{max}$(neat) 1740 cm.$^{-1}$, N.M.R. $\tau$ 6.30 (singlet), 6.98 and 7.90 (multiplets) in 3:1:2 ratio.

What is claimed is:

1. 1,5 - cis,cis - cyclooctadiene-1,2,5,6-tetracarboxylic acid bisanhydride.

2. A process for producing the compound of claim 1 which comprises irradiating crystalline trans,trans-muconic acid so as to effect a photochemical dimerisation and thereafter heating the irradiated substance to about 150° C.

3. The process of claim 2 wherein the heating is effected by distilling off a solvent of high boiling point.

4. The process of claim 3 wherein the solvent is xylene.

References Cited

UNITED STATES PATENTS 3,497,435  2/1970  Wimer et al. _____ 204—158 R

OTHER REFERENCES

Lahav and Schmidt, J. Chem. Soc. (B) 1967, (4) pp. 312–17.

Wagner & Zook, Synthetic Organic Chem., John Wiley (1953), pp. 480–3.

JOHN D. RANDOLPH, Primary Examiner

B. DENTZ, Assistant Examiner

U.S. Cl. X.R.

260—468 L, 514 L, 343.3, 343.2 R, 78 TF, 2 EA; 204—158 R